M. ARENDT.
CLOTH CUTTING MACHINE.
APPLICATION FILED FEB. 21, 1914.
1,125,434.
Patented Jan. 19, 1915.
2 SHEETS—SHEET 2.
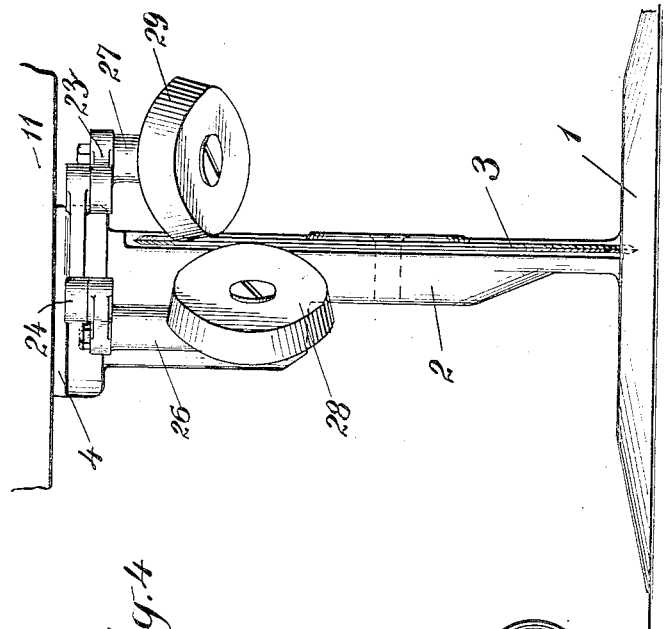
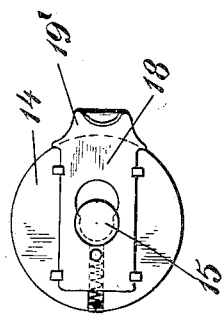
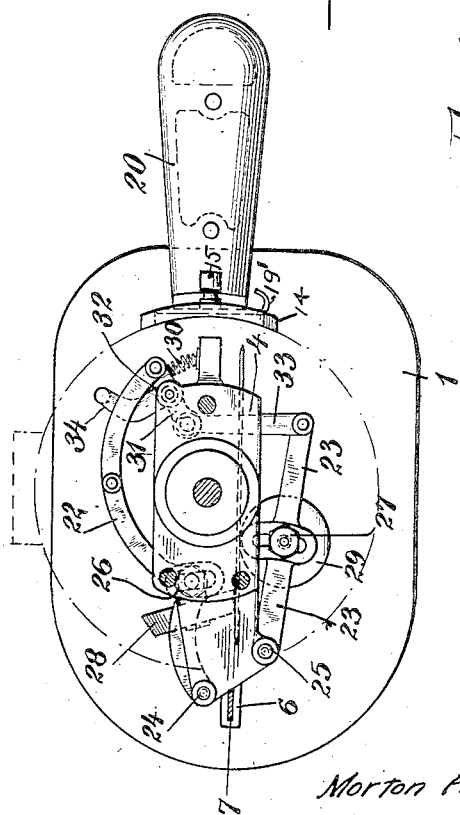
WITNESSES
INVENTOR
Morton Arendt
BY
ATTORNEYS

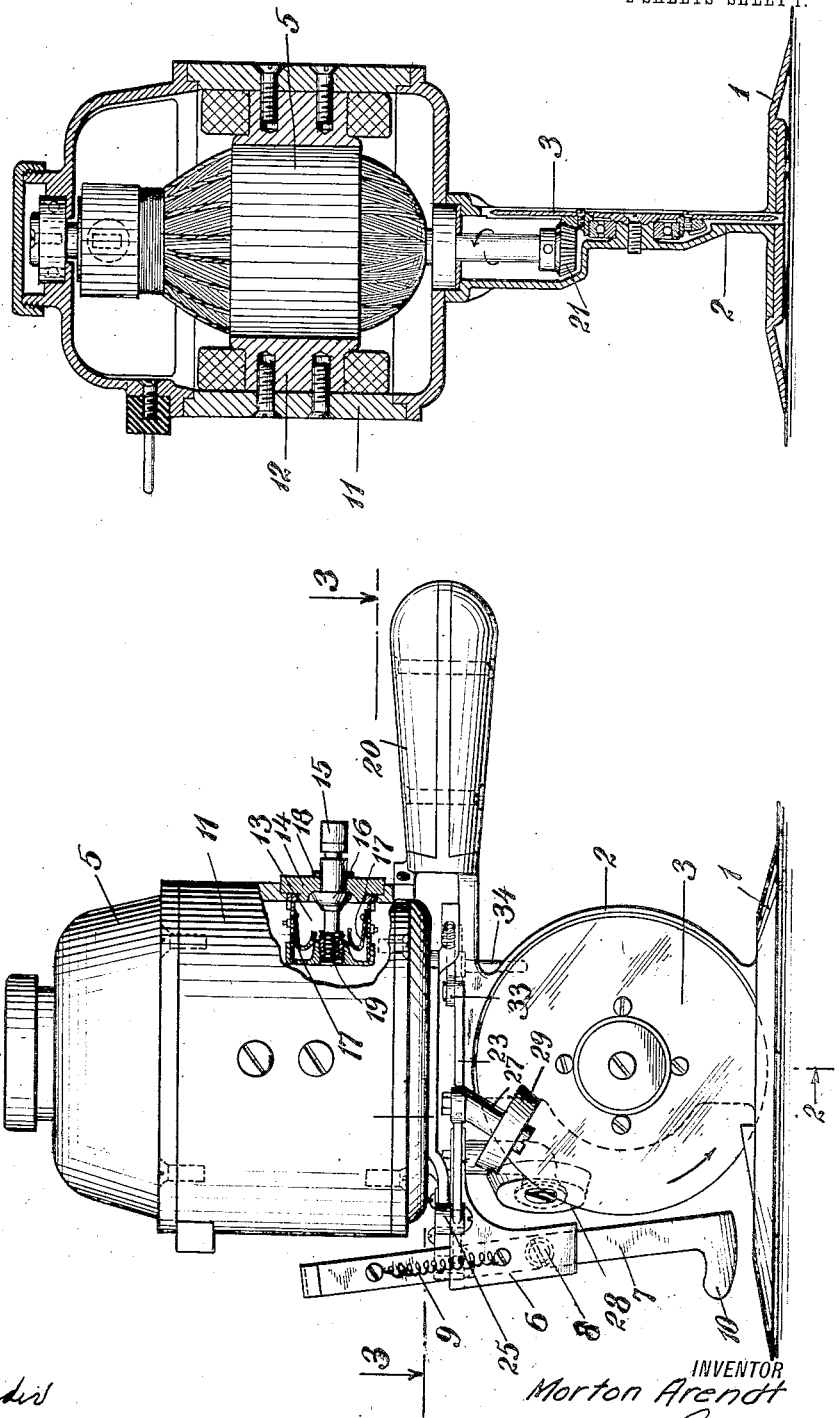

UNITED STATES PATENT OFFICE.

MORTON ARENDT, OF NEW YORK, N. Y., ASSIGNOR TO MAIMIN BROTHERS AND COMPANY, A COPARTNERSHIP CONSISTING OF DAVIS S. MAIMIN AND MEYER MAIMIN, OF NEW YORK, N. Y.

CLOTH-CUTTING MACHINE.

1,125,434.      Specification of Letters Patent.      Patented Jan. 19, 1915.

Application filed February 21, 1914. Serial No. 820,142.

*To all whom it may concern:*

Be it known that I, MORTON ARENDT, a citizen of the United States, residing at "The Ansonia," Broadway and Seventy-third street, borough of Manhattan, city, county, and State of New York, have invented certain new and useful Improvements in Cloth-Cutting Machines; and I do hereby declare the following to be a full, clear, and exact description of the invention, such as will enable others skilled in the art to which it appertains to make and use the same.

The object of the invention is to provide a cloth-cutting machine adapted to cut lays of cloth of a depth greater than half the diameter of the rotary knife, with which it will be easy to follow closely the pattern drawn or laid on the cloth, and which shall be compact and durable without exposed breakable parts. To this end, a large portion of the forward edge of the cutting knife is exposed to the view of the operator, and yet is completely guarded by a straight guard blade arranged in the plane of and in front of, but not covering, the exposed edge of the knife; and the sharpening attachment, with which such devices are customarily provided, is located inside of the guard and preferably out of the range of vision of the operator as his eye follows the cut, that is to say, behind the guard and beneath the motor and lying within the upper forward quadrant having a center coincident with the knife, so as to avoid obstructing the view of the effective cutting edge of the knife by the operator and also to avoid engagement with the top layer of cloth when the lay extends well above the center of the knife. Furthermore, the controlling switch for the electric driving motor is of the push-button type and is housed in the motor casing in proximity to the directing handle, so that it is protected from injury and yet is conveniently operated to start and stop the motor.

In the accompanying drawing, illustrating the preferred embodiment of my invention, Figure 1 is a side elevation of the complete machine, the motor casing being partly broken away to show the construction and arrangement of the electric switch; Fig. 2 is a section on the line 2—2 of Fig. 1, with the armature of the motor and its shaft shown in elevation; Fig. 3 is a plan of the machine with the motor removed, showing the mechanism for moving the grindstones; Fig. 4 is an enlarged front elevation, particularly showing the grindstones in their relation to the knife blade; and Fig. 5 is an enlarged face view of the push-button switch showing the finger actuated restraining latch therefor.

The machine illustrated has a foot 1 which is moved by the operator along the table and lifts the cloth to the cutting-knife, and from this foot rises a standard 2 constituting a support and shield for the knife 3 which is journaled therein, the standard being so shaped, as shown in Fig. 1, that the greater part of the forward cutting edge of the knife is unobstructed and exposed to view for a considerable distance above the horizontal plane of the knife center, so as to permit the cutting of lays of cloth of greater depth than half the diameter of the knife. Upon the flat top plate 4 of the standard, the motor 5 is supported, and this plate also supports a guideway 6 for the straight knife guard blade 7 arranged in the plane of and in front of, but not covering the forward edge of the knife 3. The guard blade 7 may be locked in the desired position of adjustment by the thumb screw 8, and in order that the blade may always move to the guarding position when the thumb screw is loosened, I attach the spring 9 at one end to the guide and at the other end to the guard blade, so that its normal tendency is to depress the blade onto the cloth. It will be observed that the blade 7 has the upturned toe 10 facilitating the entry of the cloth between the blade and the shoe.

The construction and arrangement of this guard blade constitute an important feature of my invention. The guard does not hide the forward edge of the knife, and by reason of this fact the operator, who sees a substantial portion of the blade above that portion which engages the cloth, is enabled to follow more accurately the line of the pattern. Furthermore, the thin blade-like form of the guard assists rather than hinders the directive effort of the operator, and at the same time gives such stiffness to the guard that it cannot be bent against the blade by any hard blow.

The electric motor 5 has the cylindrical field magnet frame 11 constituting the motor casing, and the field poles 12 are located on the sides of the machine so as to permit the housing of a push-button switch 13 within the casing. In order to avoid the reduction of the flux path of magnetic material, the face plate 14 of the push-button switch is a plug of magnetic material which fits into the opening in the frame 11 and constitutes a part of the magnetic circuit. In operating the switch, the depression of the push-button 15 brings the contact member 16 into contact with the two terminals 17, completing the electric circuit; and the button is held in that position by the spring pressed latch 18 (see Fig. 5) which has the finger piece 19' for the purpose of withdrawing the latch to permit the push-button to move to the open circuit position under the action of its spring 19. It will be observed that the adoption of the push-button type of switch makes it possible to house the switch within the motor casing, thus doing away with all liability to injury and exposure to dirt, and at the same time the adoption of a magnetic plug as the face plate of the switch prevents the disadvantageous reduction of the cross section of the magnetic flux path which would otherwise result. Furthermore, this arrangement and location of the switch makes it conveniently operable by the thumb of the operator who holds the directing handle 20.

It will be understood from Fig. 2 that the vertical shaft of the motor 5 drives directly through the pinion 21 the rotatable circular cutting-knife 3, which is mounted on ball bearings as shown.

It is customary to provide cloth-cutting machines of this character with sharpening grinder mechanism, usually in the form of a pair of grinders arranged to engage the cutting edge of the knife to sharpen it. I have adopted a novel arrangement of this grinding mechanism which is illustrated in Figs. 1, 3 and 4, and which has the advantage that the entire grinding mechanism is protected from accidental injury and at the same time the grindstones may be brought by a slight and simple movement into contact with the edge of the blade without lifting the guard, and are so located as not to lie in the line of vision of the operator looking at the cut, and not to detract his eye therefrom, and furthermore will not come in contact with the cloth, even when the latter is arranged in layers extending well above the horizontal plane of the knife center. The mechanism comprises a pair of links 22, 23 pivoted respectively at the points 24, 25 on the top plate 4 of the standard 2. Each of these links carries a stud (26, 27) on which the grindstones 28, 29 are rotatably mounted in position in proximity to the cutting edge of the knife, but the stones are normally held out of contact with that edge by the spring 30 acting on the lever 31 which is pivoted to the top plate 4 at 32, and is connected at one end to the link 22 and at the other end to the link 23 through the connecting link 33. The lever 31 has an operating handle 34 which lies in close proximity to the directing handle 20 of the machine and which, upon being turned on its pivot, brings the grindstones by lateral movement toward one another into contact with the cutting edge of the knife to sharpen it. As soon as the handle 34 is released by the operator, the stones are thrown by the spring 30 into the inoperative position. It will thus be seen that the grindstones and the operating mechanism therefor are completely concealed and protected beneath the motor, while the grindstones themselves lie inside of the guard 7 within the upper forward quadrant having a center coincident with the knife in a position such that a slight lateral movement will bring them into the sharpening position, and they are so far beneath the motor that the operator's view of the cutting edge is not obstructed by them. It will be further noted that the relative arrangement of the knife and the grindstones is such as to permit the operator to clearly view the cutting edge of the knife where the latter engages the topmost layer of cloth, so that he may accurately follow the pattern, and also renders feasible the economical and efficient cutting of deep lays or multiple plies of cloth, extending well above the horizontal plane of the knife center, and furthermore, permits the grinding of the knife to be effected at all times, even during the operation of cutting the cloth, without requiring any movement of or interference with the guard, and also without obstructing the view of the effective cutting edge of the knife by the operator.

I claim:

1. A cloth-cutting machine having a foot, a knife-carrying standard rising from the foot, a circular cutting-knife journaled in the standard, a knife-driving motor supported on the standard, and knife-sharpening grinders concealed beneath the motor and adapted to be moved laterally toward each other into simultaneous contact with the edge of the knife to sharpen it.

2. A cloth-cutting machine having a foot, a knife-carrying standard rising from the foot, a circular cutting-knife journaled in the standard, a knife-driving motor supported on the standard, a straight knife-guard supported in the plane of and in front of the knife, and knife-sharpening grinders independent of and lying inside the guard beneath the motor and adapted to be moved laterally toward each other into simultaneous contact with the edge of the knife to sharpen it.

3. A cloth-cutting machine having a circular cutting-knife, a sharpening grinder therefor comprising a pair of grindstones normally lying on opposite sides of the knife in proximity to but separated from the edge thereof, and mechanism for moving the grindstones laterally toward each other into simultaneous contact with the knife edge to sharpen it.

4. A cloth-cutting machine having a circular cutting-knife, a sharpening grinder therefor comprising a pair of grindstones normally lying on opposite sides of the knife in proximity to but separated from the edge thereof, a system of links carrying said stones, and a trigger for actuating said links to move the grindstones laterally into simultaneous contact with the knife edge to sharpen it.

5. A cloth-cutting machine having a circular cutting-knife, a sharpening grinder therefor comprising a pair of grindstones normally lying on opposite sides of the knife in proximity to but separated from the edge thereof, a system of links carrying said stones, a spring tending to hold the stones in the said normal position, and a trigger for actuating said links to move the grindstones laterally into simultaneous contact with the knife edge to sharpen it.

6. A cloth-cutting maching having a circular cutting-knife, a knife-guard, a sharpening grinder comprising a pair of grindstones normally lying inside of the guard on opposite sides of the knife in proximity to but separated from the edge thereof, and mechanism for moving the grindstones laterally toward each other into simultaneous contact with the knife edge to sharpen it.

7. A cloth-cutting machine having a foot, a knife-carrying standard rising from the foot, a circular cutting-knife journaled in the standard, a knife-driving motor supported on the standard, a sharpening grinder comprising a pair of grindstones normally lying concealed beneath the motor on opposite sides to the knife in proximity to but separated from the edge thereof, and mechanism for moving the grindstones laterally toward each other into simultaneous contact with the knife edge to sharpen it.

8. A cloth-cutting machine having a foot, a knife-carrying standard rising from the foot, a circular cutting-knife journaled in the standard, a knife-driving motor supported on the standard, a sharpening grinder comprising a pair of grindstones normally lying concealed beneath the motor on opposite sides to the knife in proximity to but separated from the edge thereof, and mechanism for moving the grindstones laterally toward each other into simultaneous contact with the knife edge to sharpen it, said mechanism being likewise concealed beneath the motor.

9. A cloth cutting machine having a foot, a standard rising from the foot, a knife driving motor supported on the standard, a circular cutting knife journaled in the standard and having an unobstructed cutting edge extending above the horizontal plane of its center and adapted to cut lays of cloth of a depth greater than half the diameter of the knife, a knife guard rigidly supported in front of the knife, and a knife-sharpening grinder located inside the guard and beneath the motor and lying within the upper forward quadrant having a center coincident with that of the knife, and means to move the grinder into and out of contact with the knife to sharpen the same.

10. A cloth cutting machine having a foot, a standard rising from the foot, a knife driving motor supported on the standard, a circular cutting knife journaled in the standard and having an unobstructed cutting edge extending above the horizontal plane of its center and adapted to cut lays of cloth of a depth greater than half the diameter of the knife, a knife guard rigidly supported in front of the knife, and a pair of grindstones located inside the guard and beneath the motor and lying within the upper forward quadrant having a center coincident with that of the knife, and means to move the stones into and out of contact with the knife to sharpen the same.

11. A cloth cutting machine having a foot, a standard rising from the foot, an electric motor supported on the standard, a circular cutting knife journaled in the standard and having an unobstructed cutting edge extending above the horizontal plane of its center and adapted to cut lays of cloth of a depth greater than half the diameter of the knife, gearing interposed between the motor and the knife axis, a knife guard rigidly supported in front of the knife, and a knife-sharpening grinder located inside the guard and beneath the motor, and lying within the upper forward quadrant having a center coincident with that of the knife, and means to move the grinder into and out of contact with the knife to sharpen the same.

12. A cloth-cutting machine having a directing handle, an electric driving motor, and a push-button motor-controlling switch housed in the motor frame in proximity to the handle.

13. A cloth-cutting machine having a directing handle, an electric driving motor, and a push-button motor-controlling switch housed in the motor frame, the face-plate of said switch being a plug of magnetic material constituting a part of the magnetic circuit of the motor.

In testimony whereof I affix my signature, in presence of two witnesses.

MORTON ARENDT.

Witnesses:
  LEON W. ROSENTHAL,
  THEODORE HANSEN.